United States Patent [19]

Robinette

[11] 4,328,051

[45] May 4, 1982

[54] SYSTEM FOR TRANSFERRING IMAGES

[76] Inventor: Rose B. Robinette, 755 Middlesex Rd., Baltimore, Md. 21221

[21] Appl. No.: 136,960

[22] Filed: Apr. 3, 1980

[51] Int. Cl.[3] .......................... B32B 31/16; B44D 2/00

[52] U.S. Cl. ...................................... 156/62; 156/229; 156/344; 273/DIG. 14; 434/84; 434/88

[58] Field of Search ................ 35/26; 40/615; 156/59, 156/62, 344, 229; 273/DIG. 14; 427/146; 428/914; 434/84, 88, 90

[56] References Cited

U.S. PATENT DOCUMENTS

| | | | |
|---|---|---|---|
| 3,030,721 | 4/1962 | Ferrari | 156/62 |
| 3,063,162 | 11/1962 | Quinn | 434/90 |
| 3,364,598 | 1/1968 | Cook | 434/88 |
| 3,455,045 | 7/1969 | Thomas | 156/59 X |
| 3,633,541 | 1/1972 | Andrews et al. | 35/26 X |
| 4,024,287 | 5/1977 | Golchert | 35/26 X |

*Primary Examiner*—Robert A. Dawson

*Attorney, Agent, or Firm*—John F. McClellan, Sr.

[57] ABSTRACT

An image-transfer system in which from the original a first tracing is made on transparent sheet material and transferred from the transparent sheet material to a net-like or reticulate material by a second tracing, from which the image is then transferred to a final substrate such as an article of clothing by a third tracing through the net-like material interstices; finally the transferred image on the substrate is completed by retouching; color as well as line can be transferred using this system.

1 Claim, 6 Drawing Figures

SYSTEM FOR TRANSFERRING IMAGES

This invention relates generally to decorating systems and particularly to a system for transferring images.

In the prior art at least one disclosure has been made which relates to superposing one layer of material on another in an imaging system: U.S. Pat. No. 3,455,045 to C. R. Thomas, July 15, 1960.

Objects of the present invention include an image transfer system which is fast, economical, easy to learn and to use, is direct and requires no keys or identifying indicia for transfer of colors or of lines; which can safely be used on expansive materials, both fabricated and unfabricated and in almost any size, and which permits re-use of components of the system for greater economy in some cases.

In brief summary given as cursory description only and not as limitation the system includes transfer of an image by translucent paper tracing, then transfer of apertured sheet overlay, followed by transfer to work surface through the apertured sheet overlay and completion.

Figure 1:
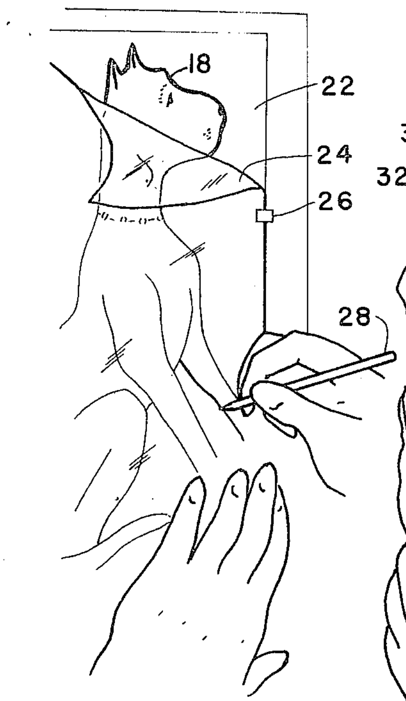
Figure 2:
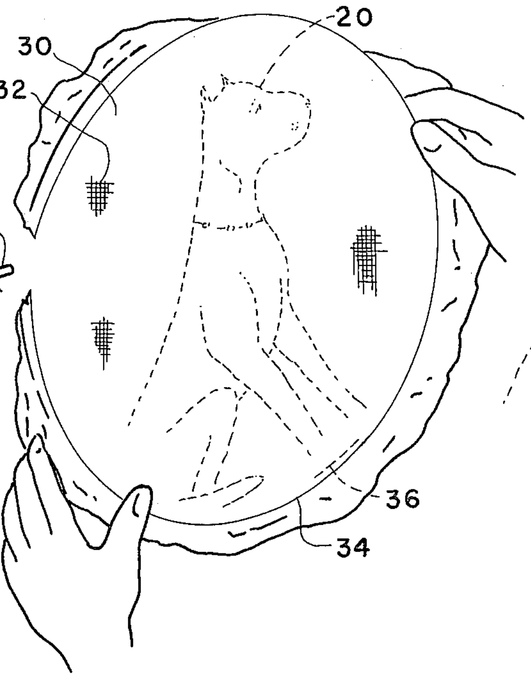
Figure 3:
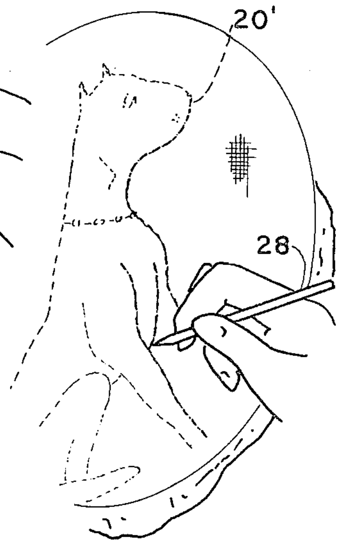
Figure 4:
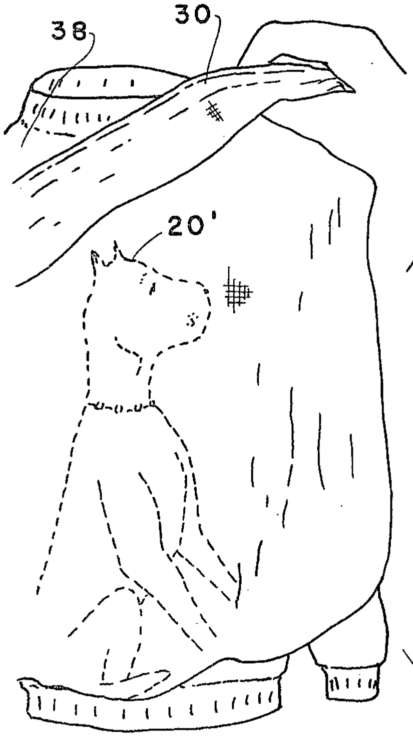
Figure 5:
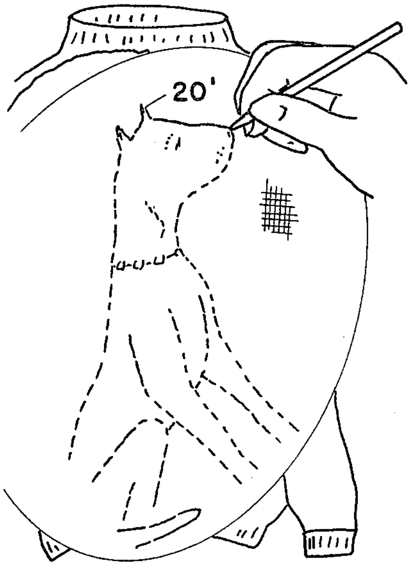
Figure 6:
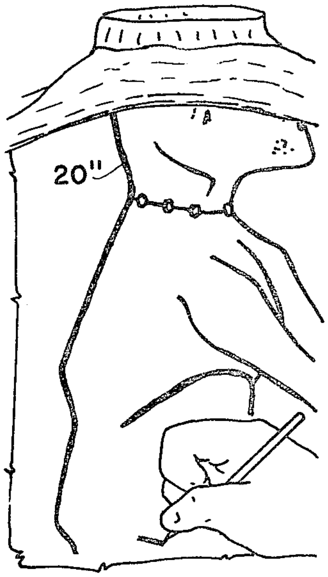

The above and other objects and advantages of this invention will become more apparent on examination of the following description, including the drawings, in which:

FIG. 1 is a perspective view of a step;
FIG. 2 is a perspective view of a further step;
FIG. 3 is a perspective view of a further step;
FIG. 4 is a perspective view of a further step;
FIG. 5 is a perspective view of a further step; and
FIG. 6 is a perspective view of the transferred image completion step.

FIG. 1 shows the first and second steps combined: after selecting an existing image 18 to be transferred from an initial substrate 22 (such as paper or cloth) to a final substrate, a light-transmitting impervious film 24 (shown with corner turned for exposition) such as transparent or translucent tracing paper is laid over the existing image. Tape 26 may be used to hold the two layers in register, and in contact to prevent parallax errors.

The existing image is then traced onto the overlaid light-transmitting impervious film using a marker 28 which may be, depending on the surface and on colors, one or more pencils, wax pencils, felt-tip pens or water color or oil paint applicators, for example. Colors may be directly traced on as well as the outlines, if desired.

FIG. 2 shows a following step, overlaying the traced image 20 with a reticulate sheet 30 or a screen which may be lightweight unsized cotton gauze such as cheesecloth having apertures 32 large enough for visibility of the tracing of the traced image. Apertures may be one to two millimeters (0.040–0.080 inch) across for average line-width work. Preferably the apertures are no greater across than two or three outline widths, to provide accurate tracing. Means for stretching and securing the two layers in contact to prevent parallax errors may be a pair of close fitting hoops or frames 34, 36. (The initial substrate preferably is removed before this step although it is evident that it need not be.)

FIG. 3 shows that next a retraced image 20' is formed on the reticulate sheet following the traced image on the light-transmitting impervious film. For this step any conventional marker 28 may be used in the tracing but to preserve the traced image on the light-transmitting impervious film a light touch with a relatively non-flowing marker may be used. Ballpoints or felt-tip pens are examples of such markers. The tips of these can be kept to the overlay relatively easily.

FIG. 4 shows following steps, overlaying the final substrate 38 with the reticulate sheet 30. Stretching and securing may be as before.

FIG. 5 shows that next the retraced image 20' is transferred through the apertures in the reticulate sheet to the final substrate, following the retraced image on the reticulate sheet with one or more marking instruments, such as those described above. Here also, care may be taken not to flow marking material onto the reticulate sheet so much as through the apertures, if it is desired to preserve the reticulate sheet for further use.

FIG. 6 shows the last step, completing the transferred image 20 on the final substrate by completing any interruptions caused by reticulations of the reticulate sheet, and thickening the lines, if desired.

In this step the same stretching means preferably is used after removal of the reticulate sheet.

Optionally, coloring can be deferred to this step but direct-transfer step-to-step can be advantageous if the user is not skilled.

As a further option, the image may be transferred to the reticulate sheet directly from a pattern as image if destruction of the pattern or image is not a problem.

For fine detailing, as an option, the user can place a sheet of Saran Wrap over the desired design then trace the picture with a ballpoint pen. After the tracing is completed the user removes the Saran Wrap from the design. Next, the user places a white sheet of paper under the Saran Wrap to give the picture more contrast.

Following this, the user places the white sheet of paper and the Saran Wrap bearing the design, with screen material over top of the Saran Wrap, onto the hoop, pulls out the slack, and proceeds to trace design with ballpoint pen onto the screen. When the design is traced off onto the screen, the screen is removed and used as stated above. "Saran Wrap"—is a trademark of the Dow Chemical Company.

As an example of required materials for a kit for producing a transfer of a comic strap type design analogous to a "SUPER HEROES" design, onto a "T"-shirt, the following would be appropriate:

COLORS NEEDED

Bright red
Bright blue
Bright yellow
Bright green
White
Black
Peach

MATERIAL NEEDED 7 tube guards
1 fine tip
1 medium tip
Screen material, $\frac{1}{2}$ yard
1 ballpoint pen
7" round hoop This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. An image transfer method for transferring to a final substrate of cloth images which may include color and may include outline comprising the steps:

(a) selecting an existing image to be transferred from an initial substrate to a final substrate;

(b) overlaying the existing image with a light-transmitting impervious film in contact with the existing image;

(c) forming a traced image of the existing image on the light-transmitting impervious film by tracing color and outline of the existing image;

(d) removing the light transmitting film from the existing image and overlaying the traced image with a reticulate sheet such as cheesecloth stretched in contact therewith and having apertures large enough for visibility, through the apertures, of the tracing of the traced image;

(e) forming a retraced image on the reticulate sheet by tracing color and outline of the traced image onto the reticulate sheet;

(f) overlaying the final substrate with the reticulate sheet;

(g) transferring color and outline of the retraced image to the final substrate by tracing through the apertures in the reticulate sheet following the retraced image on the reticulate sheet; and (h) removing the reticulate sheet and completing the image on the final substrate by completing any interruptions caused by reticulations of the reticulate sheet.

* * * * *